Feb. 14, 1928.
F. A. GODFREY
1,659,094
CONDUIT ATTACHING TO OUTLET BOXES
Filed Oct. 21, 1925
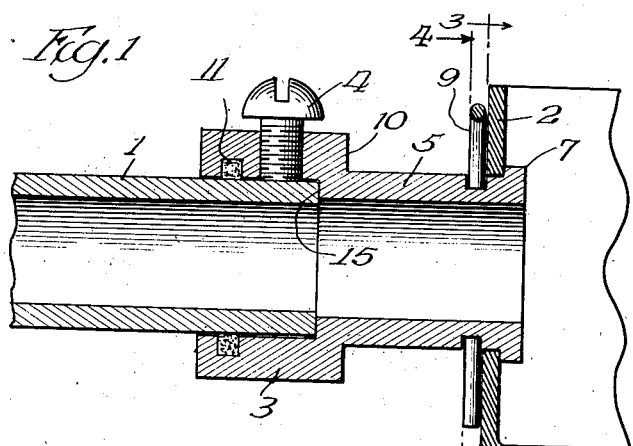
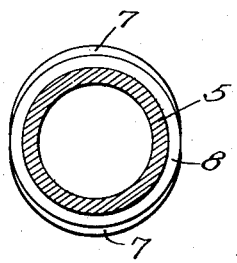
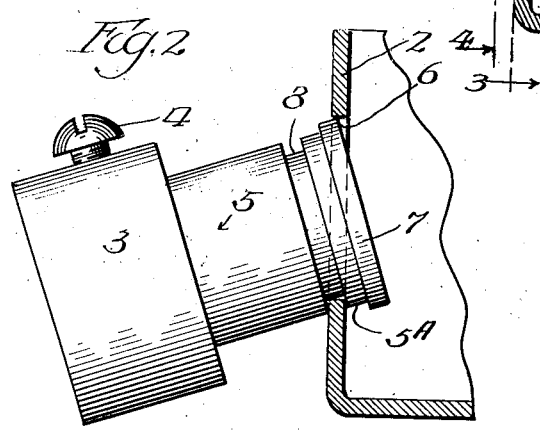
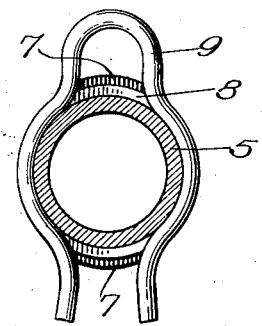
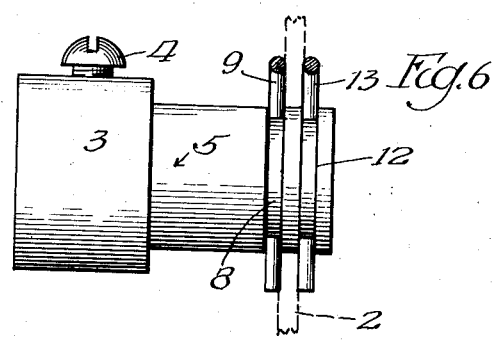
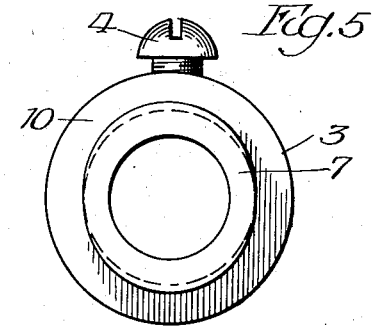
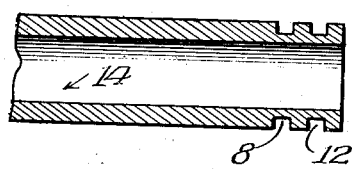
Inventor:
Fred A. Godfrey
by Albert Scheible
Attorney Patented Feb. 14, 1928.

1,659,094

UNITED STATES PATENT OFFICE.

FRED A. GODFREY, OF CHICAGO, ILLINOIS.

CONDUIT ATTACHING TO OUTLET BOXES.

Application filed October 21, 1925. Serial No. 63,933.

My invention relates to means for connecting wire conduits to outlet boxes, switch boxes or the like.

Generally speaking, my invention aims to provide arrangements for this purpose which will afford a firm securing of the conduit to the outlet box or switch box without requiring any threading of the conduit or any manipulation of the threaded nut or other member within the outlet box; which will facilitate the attaching of the conduit in cramped places, which will be inexpensive and which can easily be installed even by inexperienced persons.

Viewed in some of its more particular objects, my invention provides a conduit-attaching arrangement in which one or two spring clips entering suitably disposed grooved portions of a conduit or conduit-coupling serve for securing the conduit or coupling in operative relation to a wall of the outlet or switch box. In this aspect, my invention provides an arrangement which will be equally applicable for the direct connecting of a conduit to a wall of an outlet box by means of two simple spring clips, or for the attaching of an intermediate coupling member to such a wall.

In another aspect, my invention provides a coupling or connecting member adapted to be interposed between a conduit and a wall of an outlet box, provides such a member with end portions adapted to be inserted through the usual wall aperture in the outlet box, and shapes these end portions so that they will retain the connecting member in alined relation to the said aperture and to prevent a detaching of the connecting member from the outlet box. My invention also provides a coupling for this purpose which can readily be slid beyond its normal position into the outlet box to permit of its receiving the free end of the conduit without requiring the conduit to be retracted beyond its normal position, provides simple means for anchoring the coupling to the outlet box wall through which it partially extends, provides simple means for latching the conduit to the coupling, and provides effective means for affording a water-tight joint between the coupling and the conduit.

Still further and also more detailed objects will appear from the following specification and from the accompanying drawings, in which Fig. 1 is a central and longitudinal section through a portion of a floor outlet box, showing a fitting embodying my invention and operatively interposed between a conduit and a wall of the said box.

Fig. 2 is a section through the same outlet box wall, together with an elevation of the same fitting, showing the tilted position of the fitting when its anchoring end is being inserted through an opening in the wall of an outlet box.

Fig. 3 is a transverse section taken through the fitting or coupling of Fig. 1 along the line 3—3 and looking towards the right, while Fig. 4 is a transverse section taken in the same direction from the line 4—4 of Fig. 1.

Fig. 5 is an end view of the same coupling or fitting taken from its right hand end.

Fig. 6 is a side elevation of another form of outlet box fitting embodying my invention, namely one in which an auxiliary spring clip is employed for anchoring the fitting against detachment from the outlet box.

Fig. 7 is a central and longitudinal section through the end of a conduit formed for direct attachment to an outlet box after the manner employed in connection with the fitting shown in Fig. 6.

Referring first to Figs. 1 to 5 inclusive, these show a fitting designed for facilitating the attaching of an ordinary conduit 1 to the wall 2 of an outlet or switch box without requiring any threading of the conduit. For this purpose, I provide a fitting having an outer tubular portion 3 provided with a bore for slidably receiving the free end of the conduit and having a screw 4 threaded transversely into it for anchoring the conduit to its larger end portion 3 of the fitting. Extending beyond the said enlarged portion 3 in the opposite direction from the conduit, the fitting has a tubular main portion 5 of a diameter closely approaching the bore of the perforation 6 in the switch box wall 2. The inner end of this part of the fitting is enlarged along one diameter, as for example by making the extreme end portion 7 in the form of an ellipse having its smaller diameter corresponding to the outside diameter of the portion 5 of the fitting, so as to provide portions which will project beyond the bore 6 within the switch box as shown in Fig. 1 when the fitting is in its normal position of alinement with the bore 6 in the said wall.

The generally cylindrical portion 5 of the fitting is interrupted by a groove 8 which is spaced from the enlarged head portion 7 by a portion 5ᴬ substantially corresponding in length to the thickness of the box wall 2, this groove being of such a width and depth that it can be entered by a wall of the bore 6 when the fitting is tilted as shown in Fig. 2 to permit one edge of the enlarged head portion 7 to enter the bore after the opposite edge of this head portion has already been inserted into the box through the said bore. When the fitting is swung back out of its entry position of Fig. 2 into axial alinement with the bore in the wall, it can readily be lifted and retracted slightly, so as to cause the wall bore to house the portion 5ᴬ which then supports the coupling concentric with the said bore, while the diametrically enlarged portions of the head 7 prevents a withdrawal of the inner end of the fitting from the box. The fitting is subsequently anchored to the box, desirably by employing a substantially U-shaped spring clip 9 formed of wire and having its shanks concaved towards each other and adapted to snap into the groove 8.

If the conduit has been laid in its approximate position before the outlet box is installed, or if local conditions interfere with a ready movement of the free end of the conduit away from the box, it might be difficult to insert the end of the conduit into the larger end 3 of the coupling after the latter has been secured to the outlet box in the manner above described. To avoid such difficulties, I desirably make the portion 5 of the fitting which is between the forward face 10 of the larger part 3 and the part 5ᴬ of a length slightly greater than the length of the larger diametered bore in this part 3. By doing so, I can permit the fitting to be slid inwardly of the box until the said face 10 engages the wall 2 of the box, after which the conduit 1 is swung into alinement with the fitting and the latter is partially retracted from the box while its tubular portion 3 is being slid over the end of the fitting.

To insure a water-tight connection between the coupling and the conduit, I also desirably form a groove in the larger diametered bore near the rear end of the latter and seat a packing ring or washer 11 in this groove, the packing ring having a bore which is normally somewhat smaller than the outside diameter of the conduit 1 so as to afford a tight seal between the fitting and the conduit.

With an outlet box fitting thus constructed, the end of the conduit does not need to be threaded, thus saving the expense of a threading operation after the conduit is cut to the proper length. So also, the electrician does not need to reach into the outlet box or switch box either with his fingers or with any tools when attaching the above described conduit fitting and does not need to rotate any lock-nuts or bushings after the heretofore customary manner. Hence there is decided saving of time in the connecting of each conduit to the outlet box. Moreover, since the auxiliary fastening element 9 can readily be attached by a straight sliding movement transverse of the fitting, very little room is required for this purpose, so that the entire attaching can be effected after the outlet box has been fastened down and the conduit can be run after the reinforcing rods for the concrete have been placed in position. So also, my arrangement avoids the necessity of holding the outlet box up during the attaching, as is often necessary with the lock-nuts and bushings heretofore in use, and expedites the attaching of conduits to narrow switch boxes in which it is difficult for the electrician to manipulate the inner lock-nut.

However I do not wish to be limited to having one of the anchoring means at the inner end of the fitting integral with the body of the latter, nor to the application of the general principles of my invention to a wire duct in the form of a fitting or connecting member separate from the conduit proper. For example, Fig. 6 shows a fitting similar in most respects to that of Figs. 1 and 2 but having its forward or smaller diametered tubular portion provided with an auxiliary groove 12 which is normally disposed inwardly of the wall 2 of the outlet box and which is adapted to receive a second wire clip 13. When this type of fitting is thus attached, the two auxiliary clips 9 and 13 respectively engage the inner and outer faces of the wall 2 and the fitting may be installed by a simple sliding movement without requiring a preliminary tilting after the manner of Fig. 2.

Likewise, the two grooves 8 and 12, spaced by a distance corresponding substantially to the thickness of the wall 2, may be formed directly on the end of a conduit 14 as shown in Fig. 7, thereby saving the expense of providing a separate interposed fitting. In this case, the two grooves can be cut at the conduit factory adjacent to each end of the conduit, and whenever the conduit needs to be cut to a special length these grooves can readily be formed with simple tools on the job either simultaneously with the cutting-off of the conduit or subsequent to this cutting operation.

Hence my invention lends itself to a variety of embodiments all designed to expedite the installing of conduits and to reduce the expense of the installation. In view of these variations, I do not wish to be limited to the details of the construction and arrangement above disclosed, it being obvious that many modifications might be made without departing either from the spirit of my invention or from the appended claims.

I claim as my invention:—

1. Means for connecting a conduit fitting to an outlet box having a wall provided with an aperture, comprising a tubular member having its main portion of a diameter slidably fitting the said aperture; the inner end of the said member being radially enlarged along one diameter and the said main portion having a peripheral groove spaced from the said enlarged end and adapted to have a part of the groove be entered by a wall portion of the aperture when the said member is tilted, to permit the radially enlarged end portion diametrically opposite the said groove part to be inserted through the aperture, and a fastening member interlocking with the said groove and adapted to engage the outer face of the said wall to prevent an inward movement of the tubular member with respect to the outlet box.

2. A conduit connection as per claim 1, in which the tubular member has a projection at the opposite side of the groove from the said enlarged end and spaced from the groove, the projection being adapted to engage the said wall of the outlet box to limit the entry of the tubular member into the outlet box during the attaching of the said member to the box.

Signed at Chicago, Illinois, October 15th, 1925.

FRED A. GODFREY.